United States Patent

Hung

[11] Patent Number: 6,127,924
[45] Date of Patent: Oct. 3, 2000

[54] SECURITY SYSTEM CAPABLE OF LOCATING A STOLEN CAR

[76] Inventor: Chin-Hui Hung, 3rd Fl., No. 1, Lane 46, Lin-Sen Rd., Yungho City, Taipei Hsien, Taiwan

[21] Appl. No.: 09/273,222

[22] Filed: Mar. 19, 1999

[51] Int. Cl.⁷ .................................................. B60R 25/10
[52] U.S. Cl. .................. 340/426; 340/427; 340/434; 340/439; 340/531; 340/532; 340/533; 340/425.5; 340/539; 340/825.44; 340/825.69; 340/825.72; 455/517; 455/524; 455/456
[58] Field of Search ................... 340/426, 427, 340/434, 439, 531, 532, 533, 425.5, 539, 825.44, 825.69, 825.72; 455/517, 524, 456

[56] References Cited

U.S. PATENT DOCUMENTS

| | | | |
|---|---|---|---|
| 5,132,551 | 7/1992 | Carlo et al. | 307/10.3 |
| 5,673,305 | 9/1997 | Ross | 379/58 |
| 5,805,057 | 9/1998 | Eslaminovin | 340/426 |
| 5,828,296 | 10/1998 | Watanabe | 340/426 |

*Primary Examiner*—Jeffery A. Hofsass
*Assistant Examiner*—Tai T. Nguyen
*Attorney, Agent, or Firm*—Patterson & Keough, P.A.

[57] ABSTRACT

A security system includes a control center, a controller installed in a car, a plurality of base stations installed in gas stations and houses, and a releaser. When a car owner finds that his/her car has been stolen, he/she can make a telephone call to the control center. The control center is guided to call the controller through a pager network and command the controller to enter into a searching mode to transmit a searching signal to search for a base station. After a base station receives and confirms the searching signal, the base station transmits a control signal to activate the controller to stop supplying gas and electricity to the car whereby the car is locked and located. In addition, each base station is integrated with a home security and remote control system to enhance its capability.

10 Claims, 19 Drawing Sheets

SECURITY SYSTEM CAPABLE OF LOCATING A STOLEN CAR

BACKGROUND OF THE INVENTION

1. Field of the Invention

The present invention relates to a security system, more particularly, to a security system that can assist a car owner to find his/her stolen car and provide a burglary detection and prevention function for a house.

2. Description of Related Art

Currently, alarm devices are usually installed in a car to prevent a thief from entering the car. The alarm device makes use of one or more sensors to detect the intrusion of a thief thereby honking a horn to frighten the thief and notify the car owner of such activity. However, use of such an alarm device may be useless if the car owner is out of the audible range of the horn. Further, when the car has been stolen, the alarm device does not provide any help to the user in finding the car. Therefore, it has been proposed to integrate the alarm device with the Global Positioning System (GPS) and a mobile telephone to provide the alarm device with a remote control and a location function for a car. That is, a GPS transmitter and a mobile telephone are installed in a car such that the car can be remotely controlled via the mobile telephone network and located by using the Global Positioning System. Accordingly, a stolen car can be located and controlled to assist the car owner in finding the car. This improved system is useful in preventing a thief from stealing a car. However, the cost of using such a system is extremely high because the Global Positioning System is expensive and further, the car owner has to pay the monthly fee for the mobile phone. Therefore, it is desired to have an economical and practical solution to provide the car owner with a security system capable of assuring that his/her car will not be stolen and lost.

SUMMARY OF THE INVENTION

The objective of the present invention is to provide an economical security system that can effectively assist a car owner to find a stolen car and to protect a house from burglary.

To achieve the objective, the security system of the present invention includes a control center, a controller installed in a car, a plurality of base stations installed in gas stations and houses and a releaser. The control center has a telephone device, a master controller and a computer. When a car owner finds that his/her car has been stolen, he/she can make a telephone call to the telephone device of the control center to enter the car owner data into the computer. After the data is verified, the master controller calls the controller (12) through a pager network to command the controller to enter into a searching mode to transmit a searching signal to search for a base station. After a base station (13) receives and confirms the searching signal, the base station transmits a control signal to activate the controller to stop supplying gas and electricity to the car. In addition, each base station can be integrated with a home security and remote control system thereby enhancing its capability.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
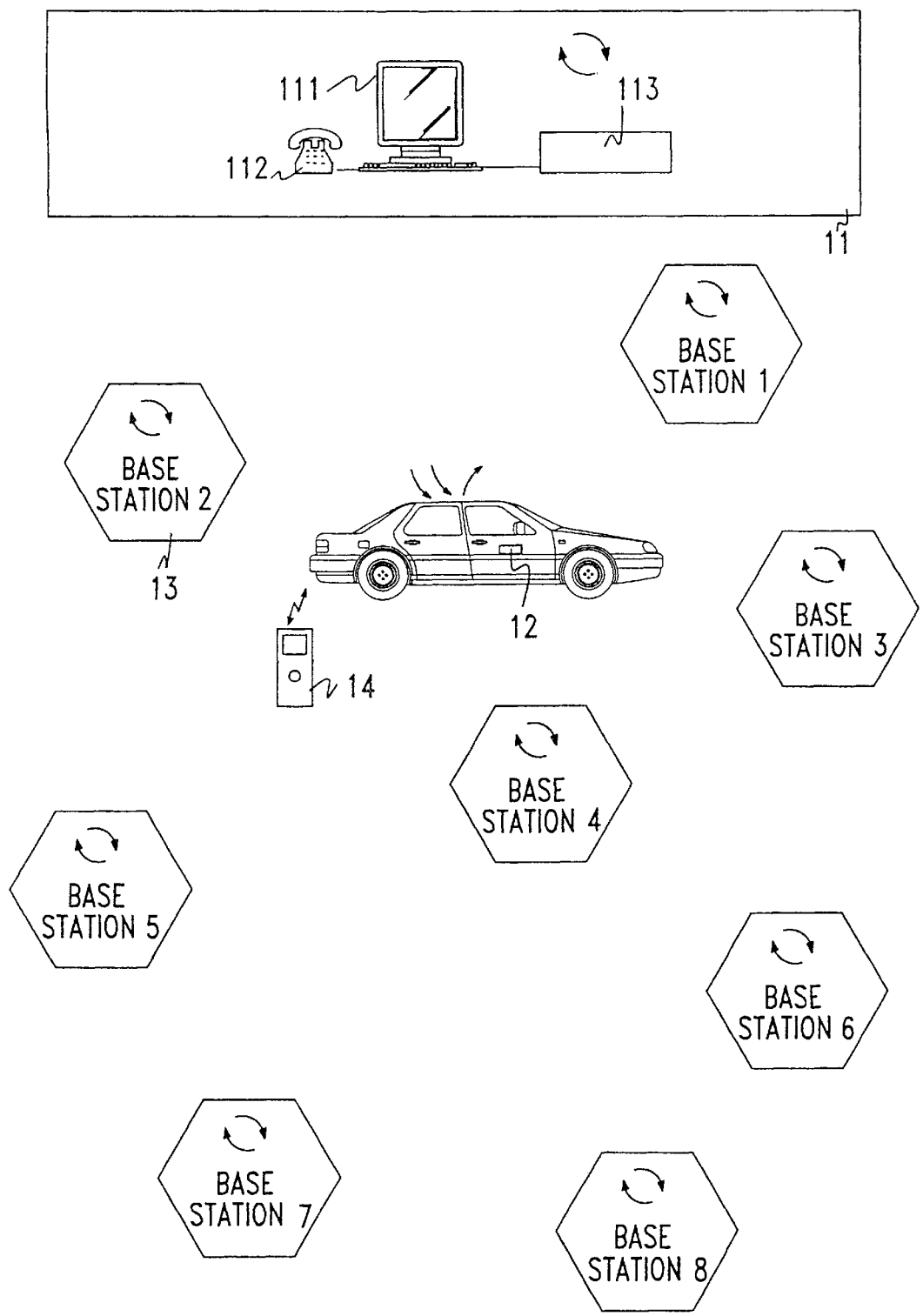
FIG. 1 is a system block diagram of a security system in accordance with the present invention.

FIG. 1 is a system block diagram of a security system in accordance with the present invention, which includes a control center (11), a controller (12) installed in a car, a plurality of base stations (13) installed in different locations such as gas stations and houses which are close to roads, and a releaser (14). Each of controller (12), the plurality of base stations (13) and the releaser (14) has an identification number so that they can be identified to belong to an individual security system.

Figure 2:
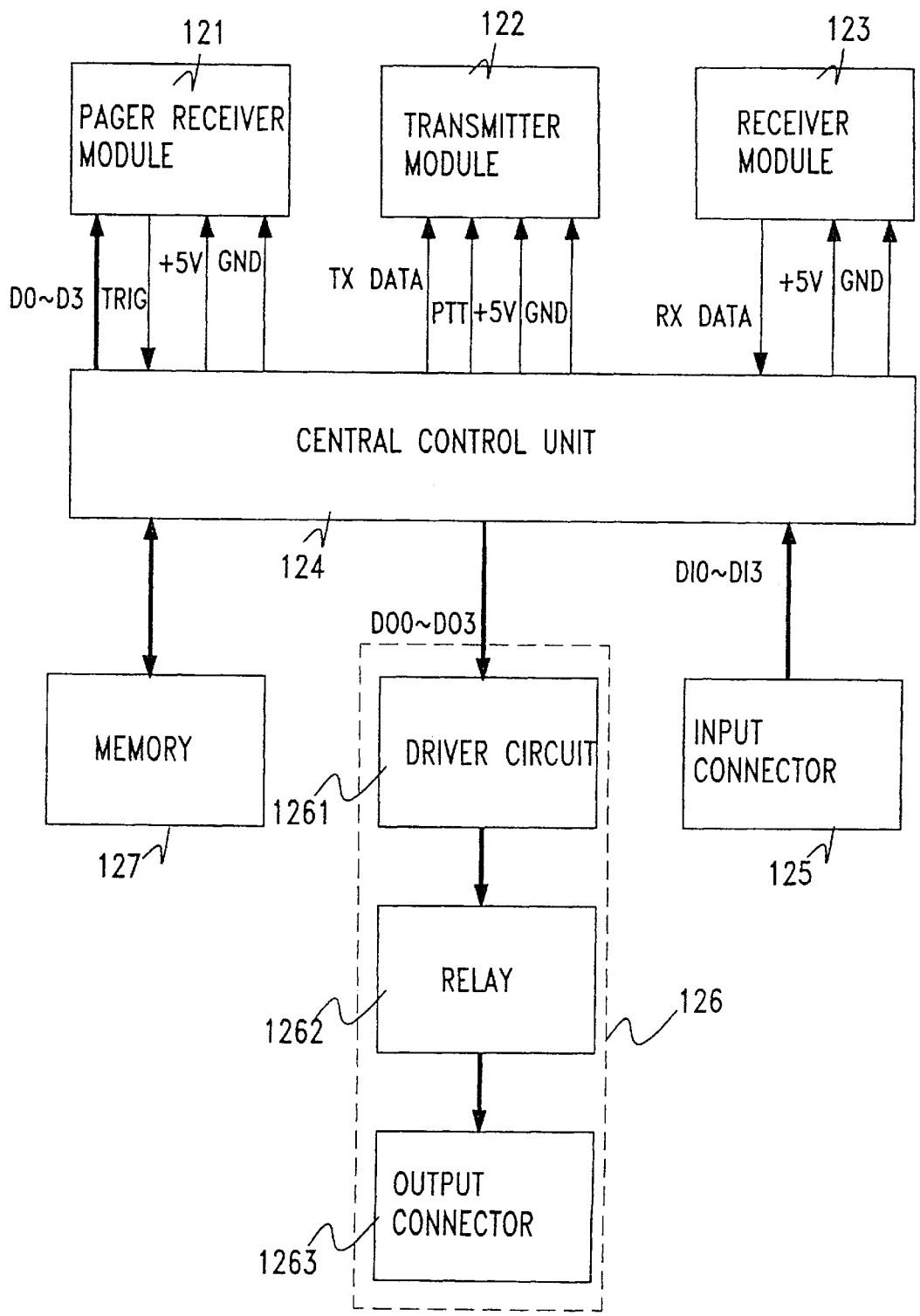
FIG. 2 is a functional block diagram of the controller shown in FIG. 1.
Figures 3A, 3B:
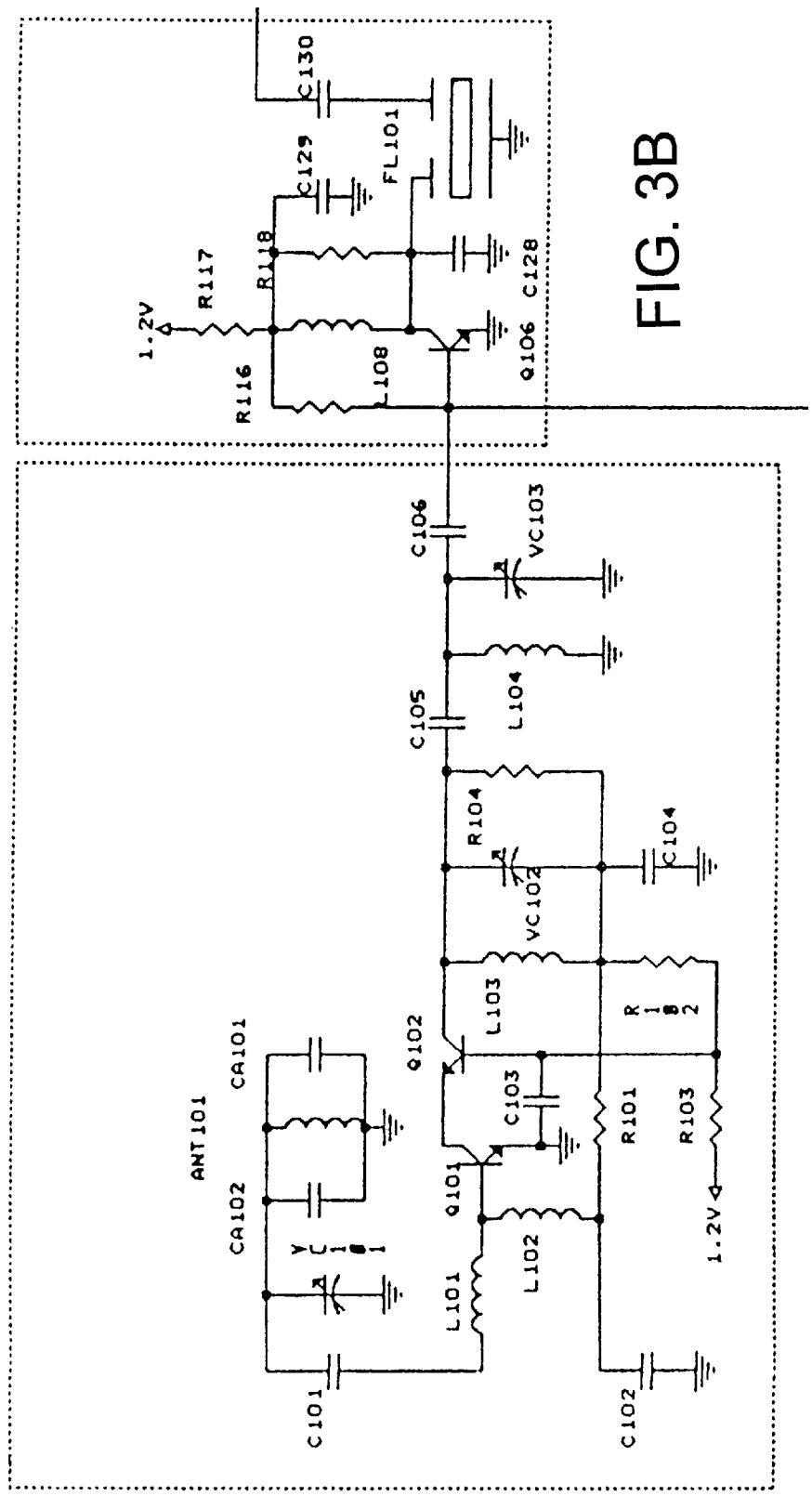
FIG. 3A is a portion of a circuit diagram for implementing the transmitter module of the controller shown in FIG. 2.
FIG. 3B is a portion of a circuit diagram, which adjoins FIGS. 3A and 3E, for implementing the transmitter module of the controller shown in FIG. 2.
Figure 3C:
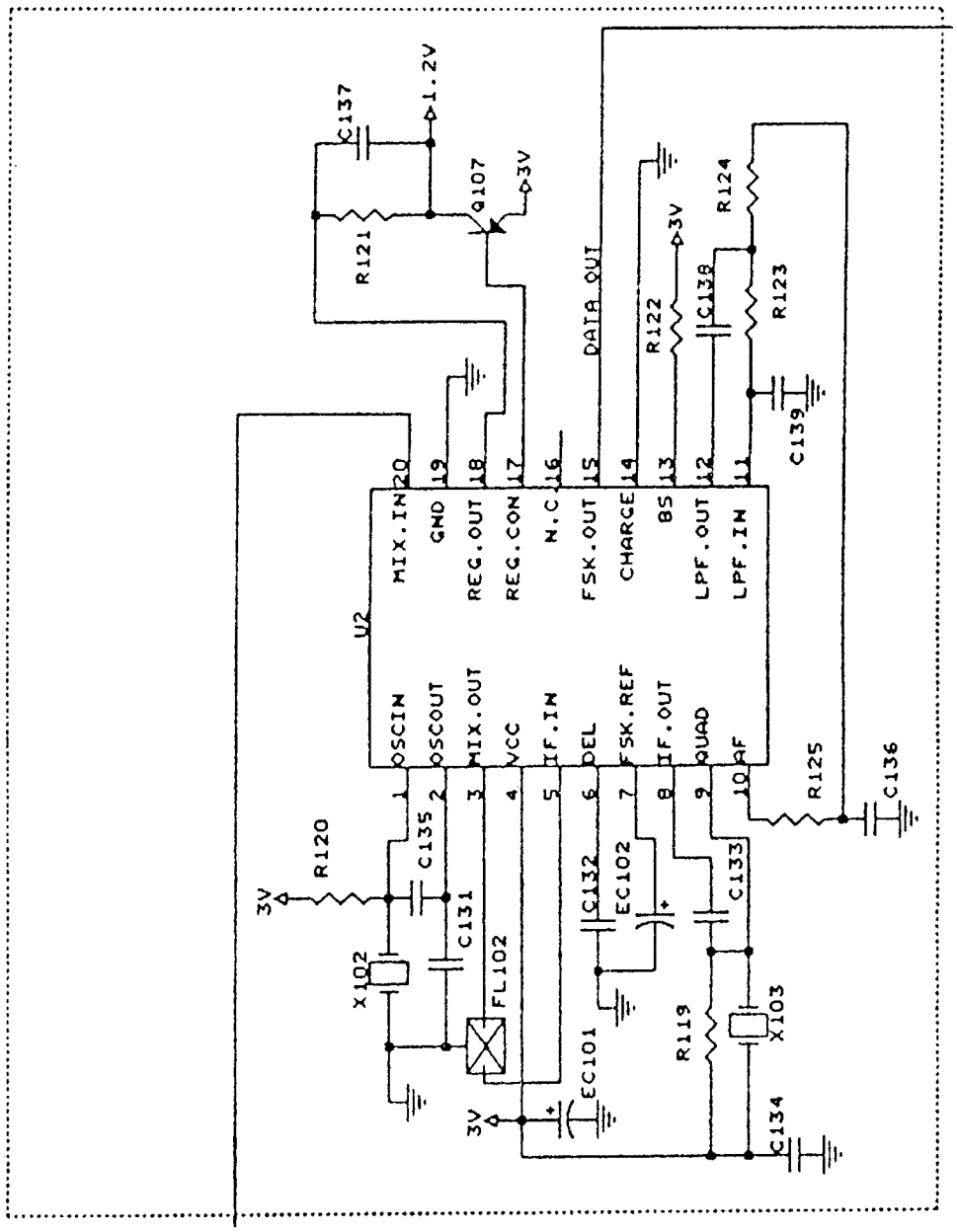
FIG. 3C is a portion of a circuit diagram, which adjoins FIGS. 3B and 3D, for inplementing the transmitter module of the controller shown in FIG. 2.
Figure 3D:
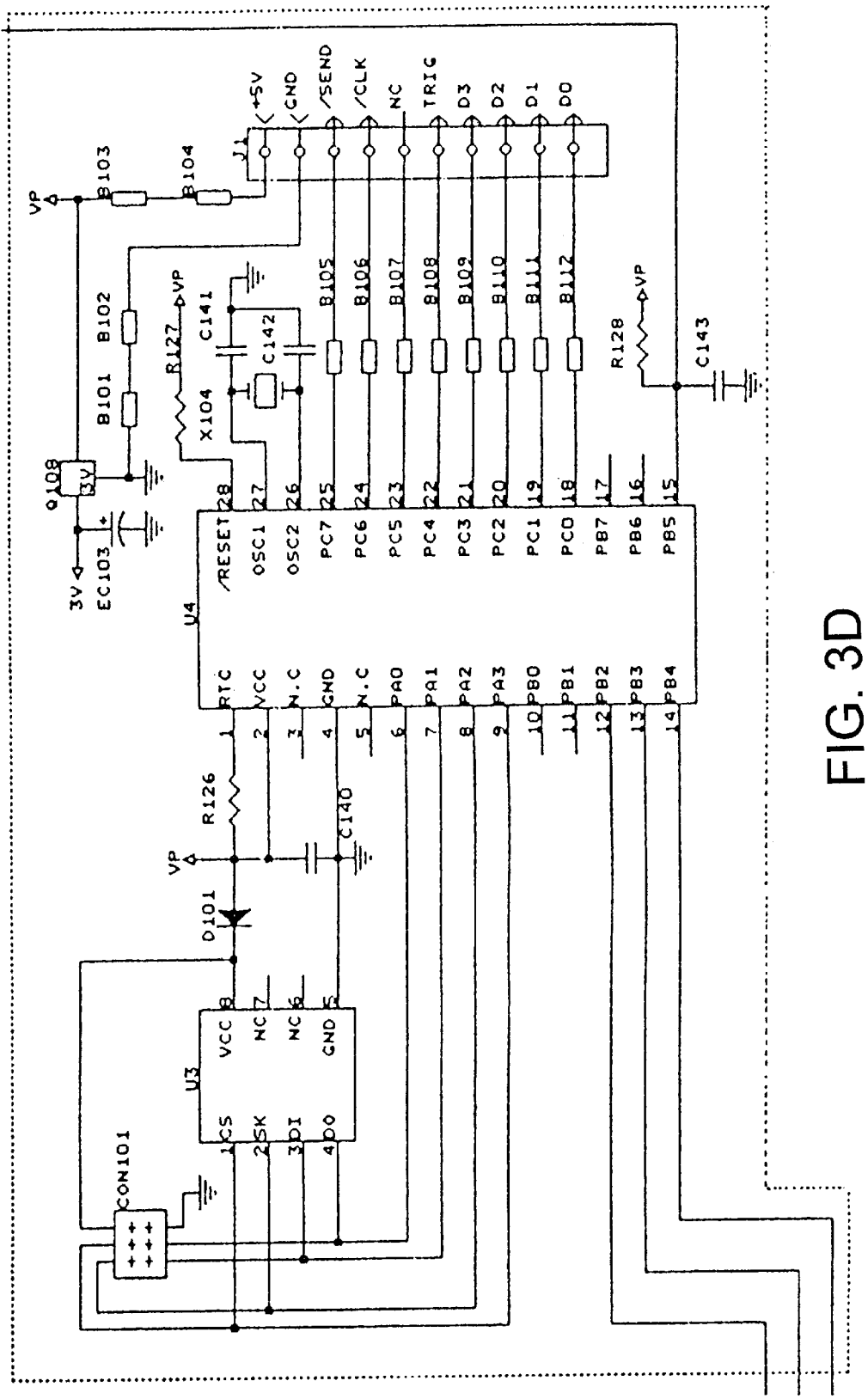
FIG. 3D is a portion of a circuit diagram, which adjoins FIGS. 3C and 3E, for implementing the transmitter module of the controller shown in FIG. 2.
Figure 3E:
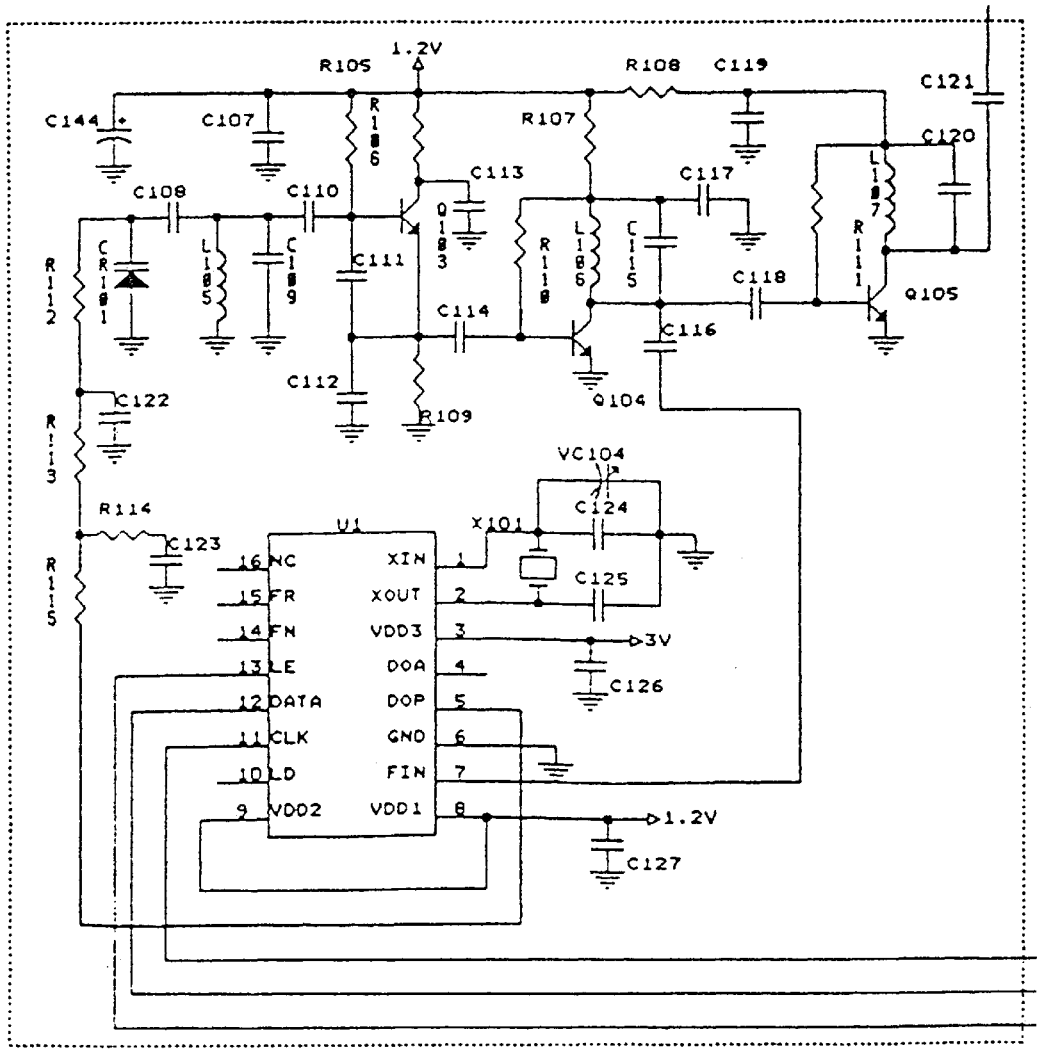
FIG. 3E is a portion of a circuit diagram, which adjoins FIGS. 3A and 3D, for implementing the transmitter module of the controller shown in FIG. 2.
Figure 4A:
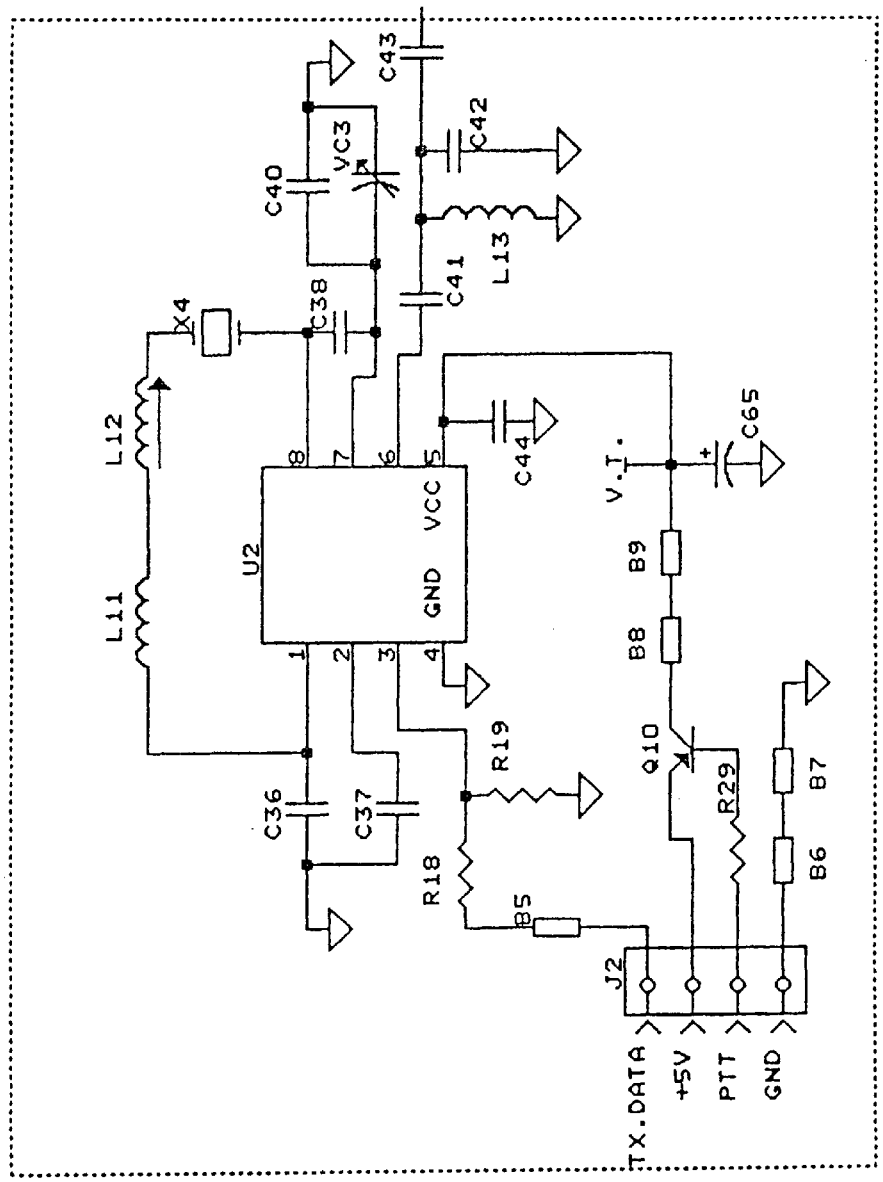
FIG. 4A is a portion of a circuit diagram for implementing the transmitter module of the controller shown in FIG. 2.
Figure 4B:
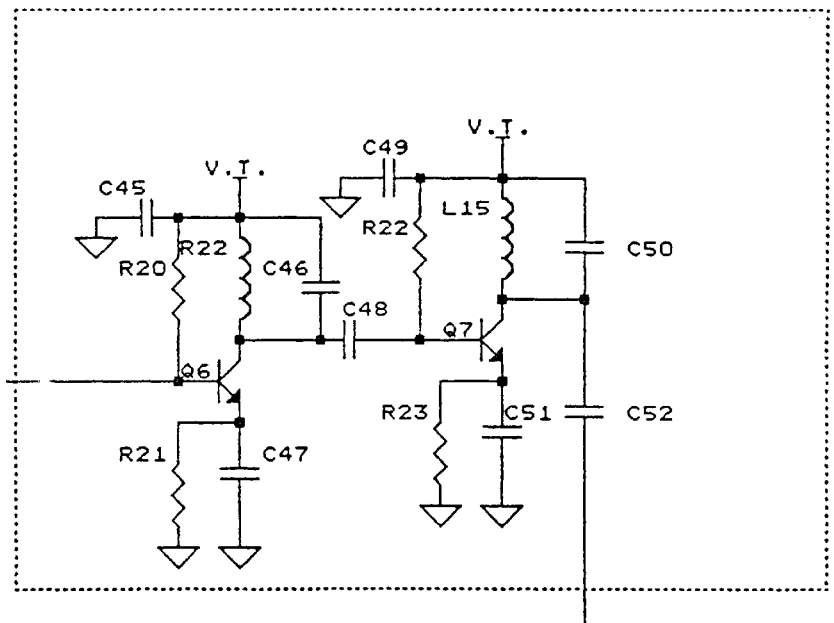
FIG. 4B is a portion of a circuit diagram, which adjoins FIG. 4A, for implementing the transmitter module of the controller shown in FIG. 2.
Figure 4C:
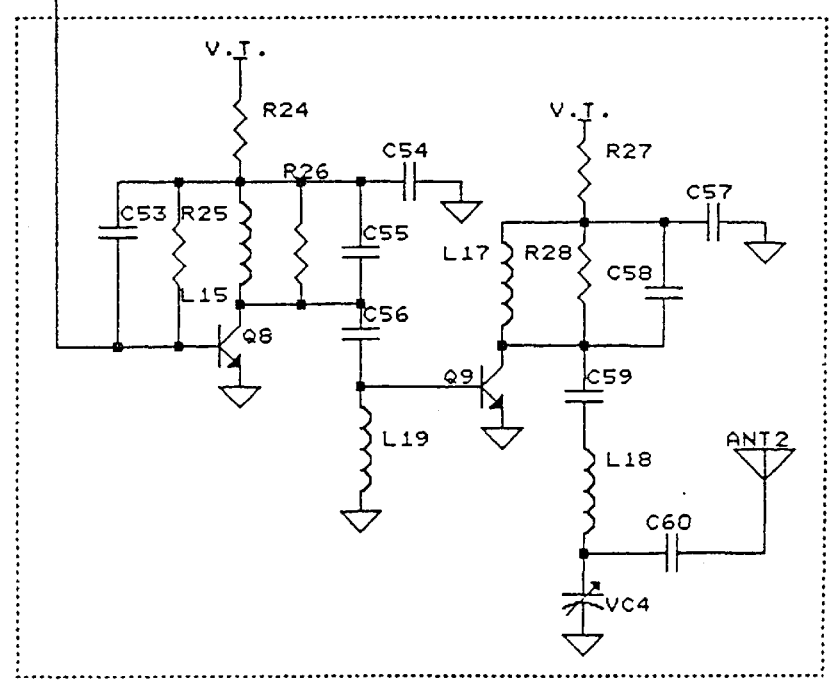
FIG. 4C is a portion of a circuit diagram, which adjoins FIG. 4B, for implementing the transmitter module of the controller shown in FIG. 2.
Figure 5A:
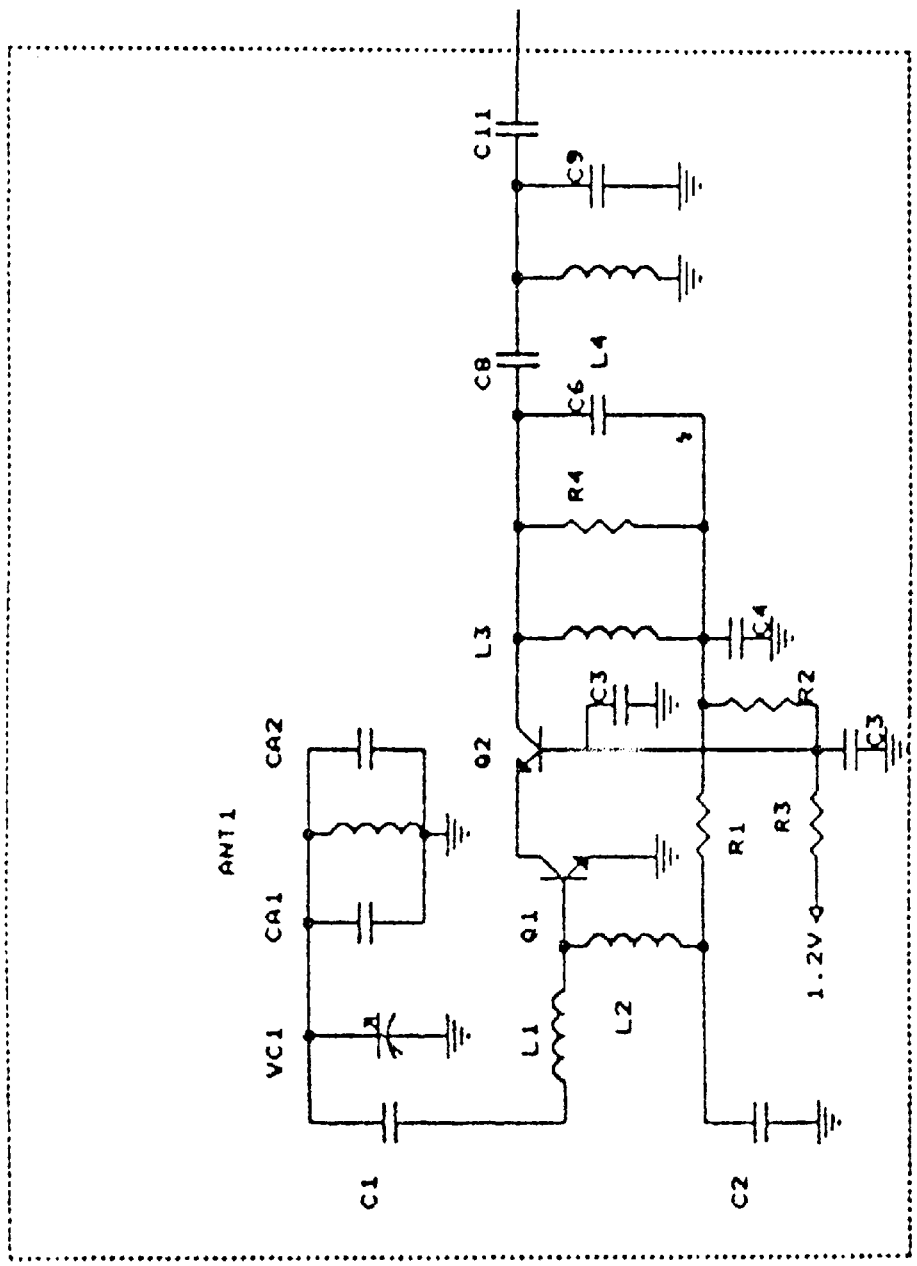
FIG. 5A is a portion of a circuit diagram for implementing the receiver module of the controller shown in FIG. 2.
Figure 5B:
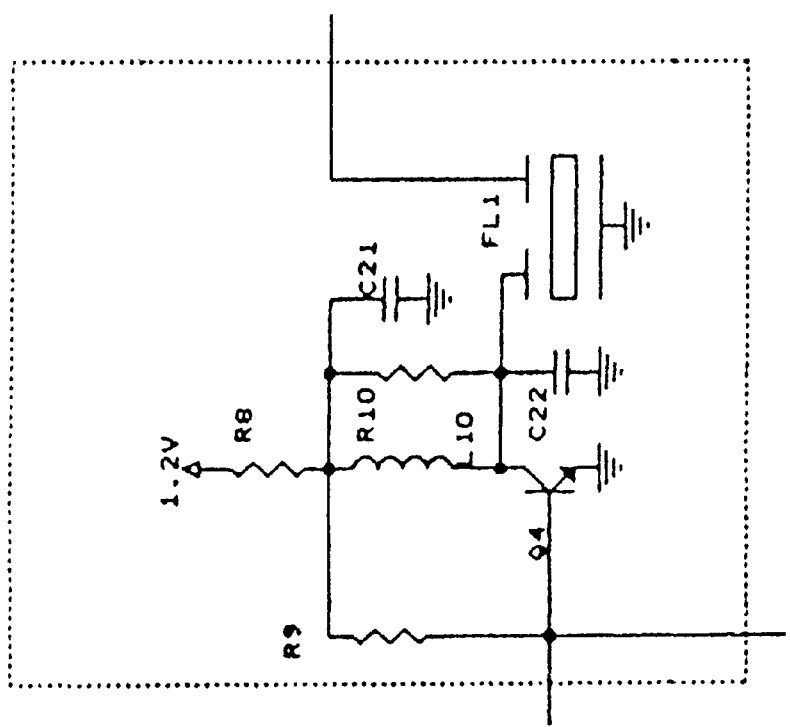
FIG. 5B is a portion of a circuit diagram, which adjoins FIGS. 5A, 5C and 5D, for implementing the receiver module of the controller shown in FIG. 2.
Figure 5C:
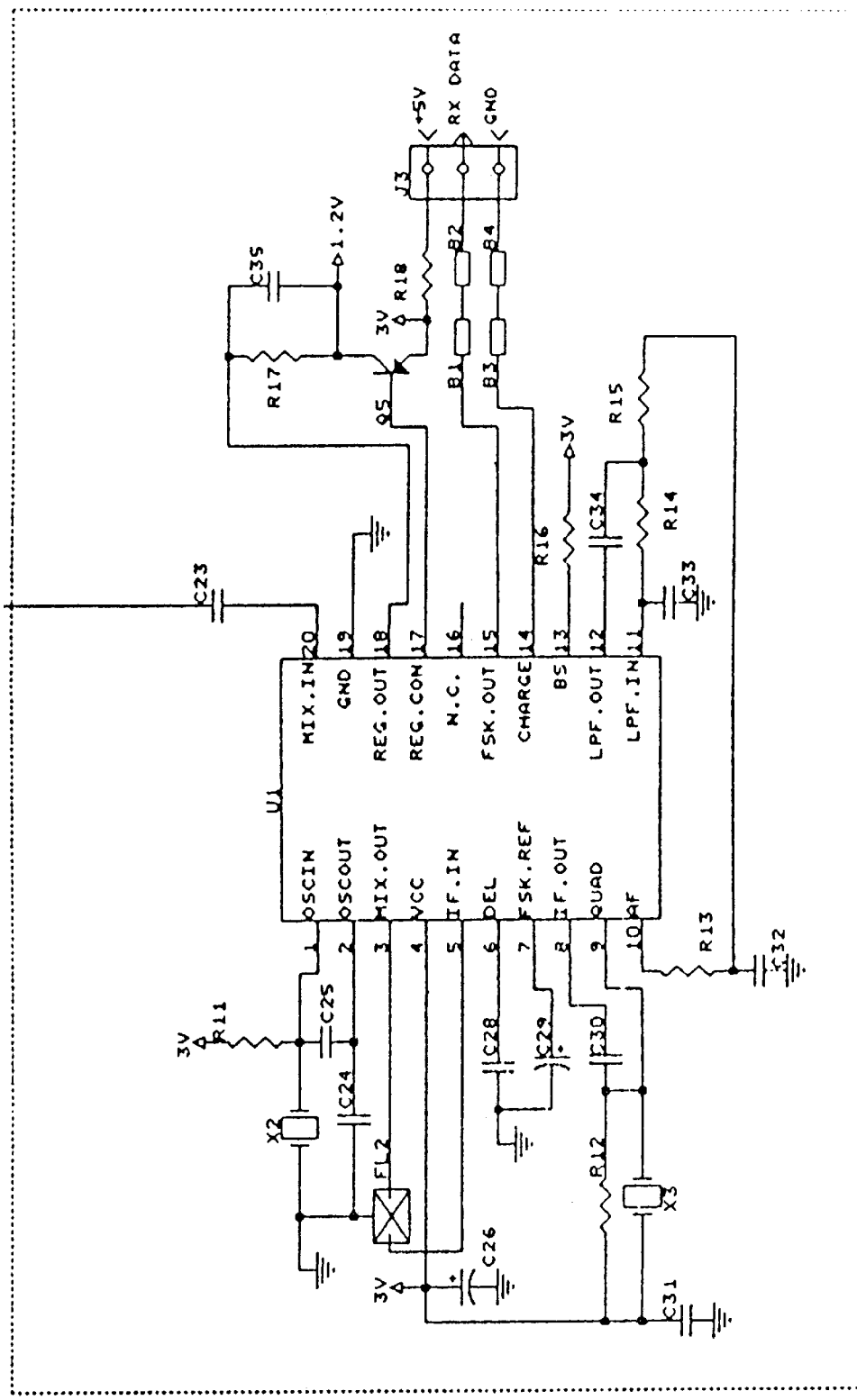
FIG. 5C is a portion of a circuit diagram, which adjoins FIG. 5B, for implementing the receiver module of the controller shown in FIG. 2.
Figure 5D:
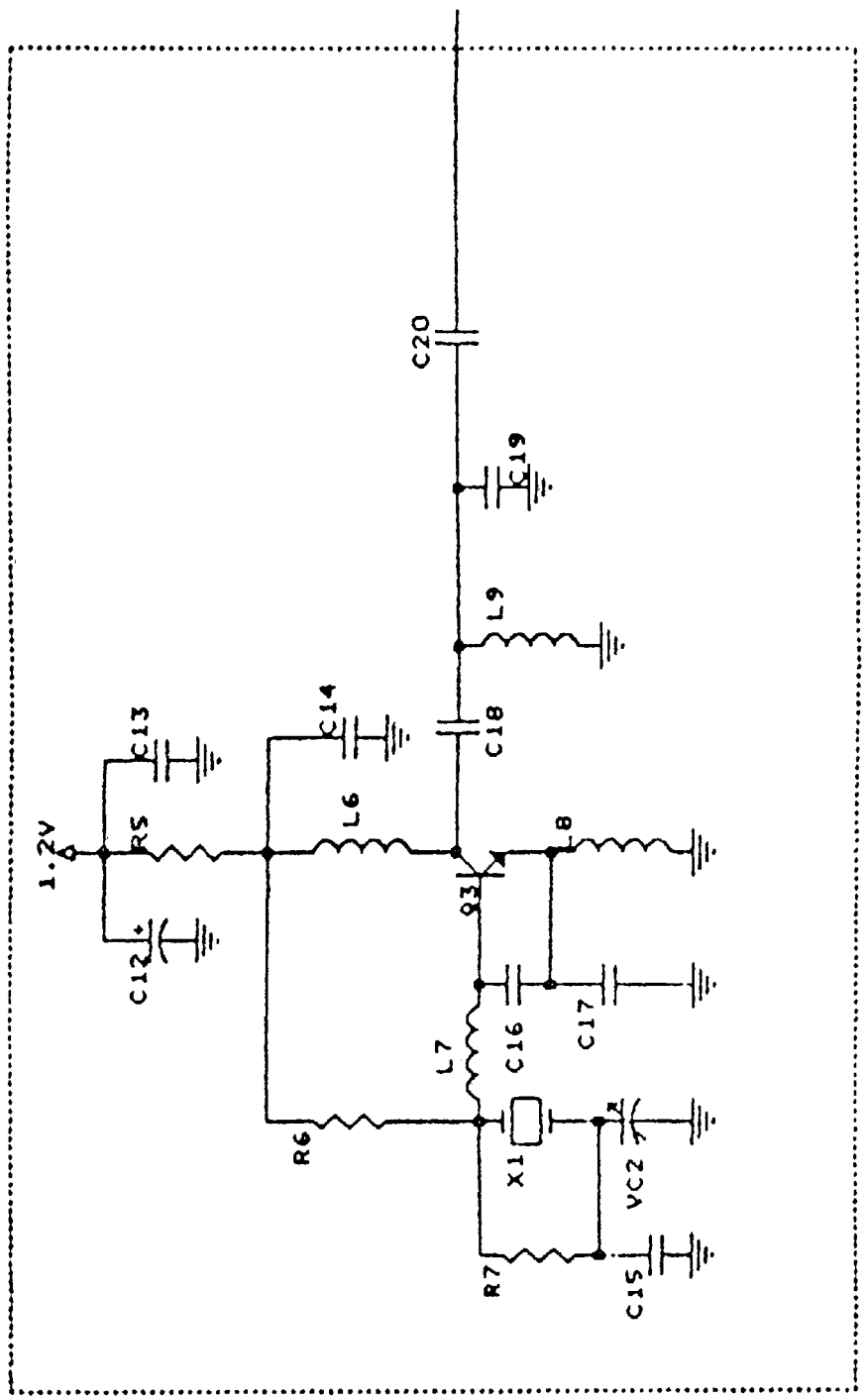
FIG. 5D is a portion of a circuit diagram, which adjoins FIG. 5B, for implementing the receiver module of the controller shown in FIG. 2.
Figure 6A:
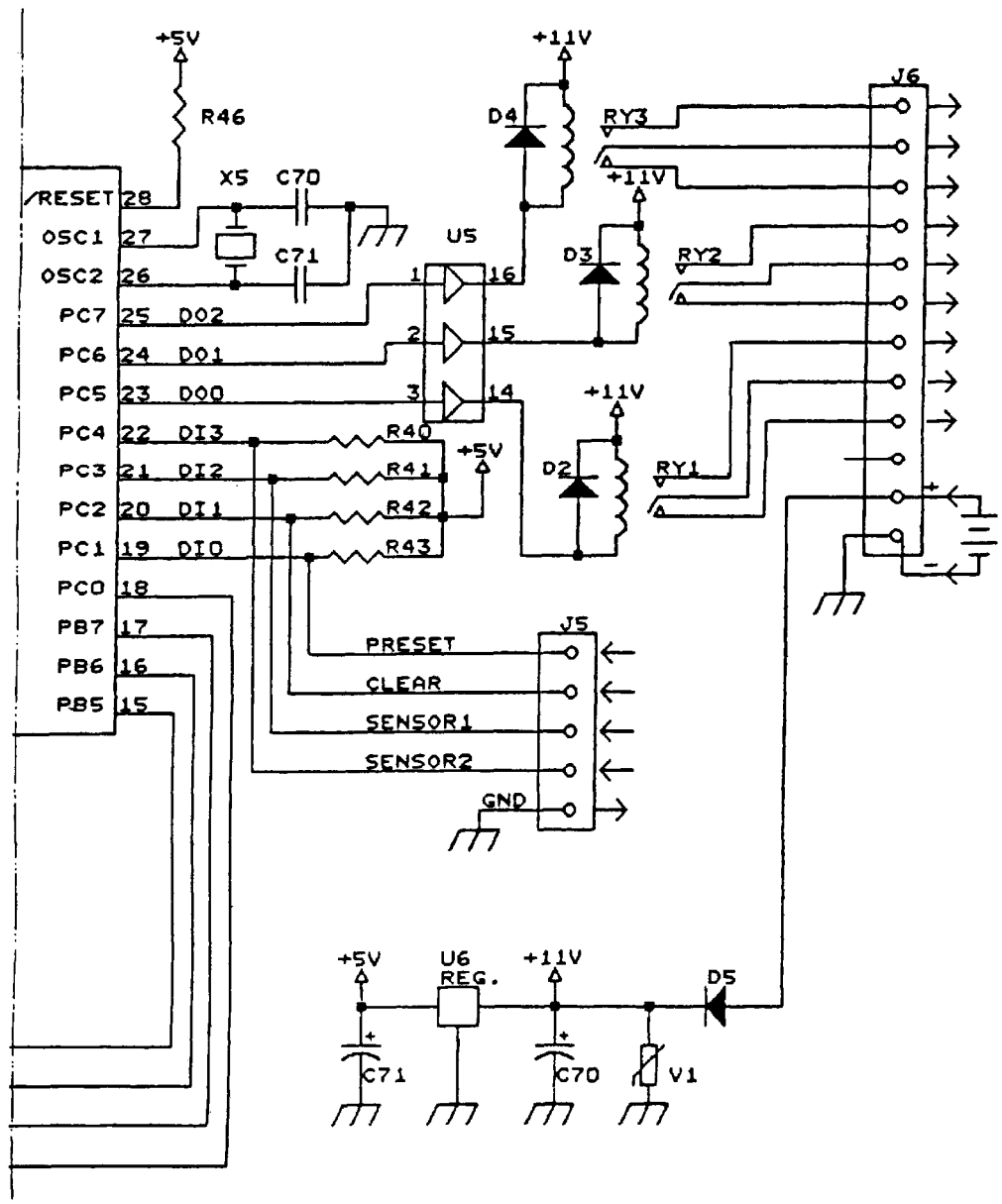
FIG. 6 is a circuit diagram for implementing the central control unit, the input connector, the output unit and the memory of the controller shown in FIG. 2.
Figure 6B:
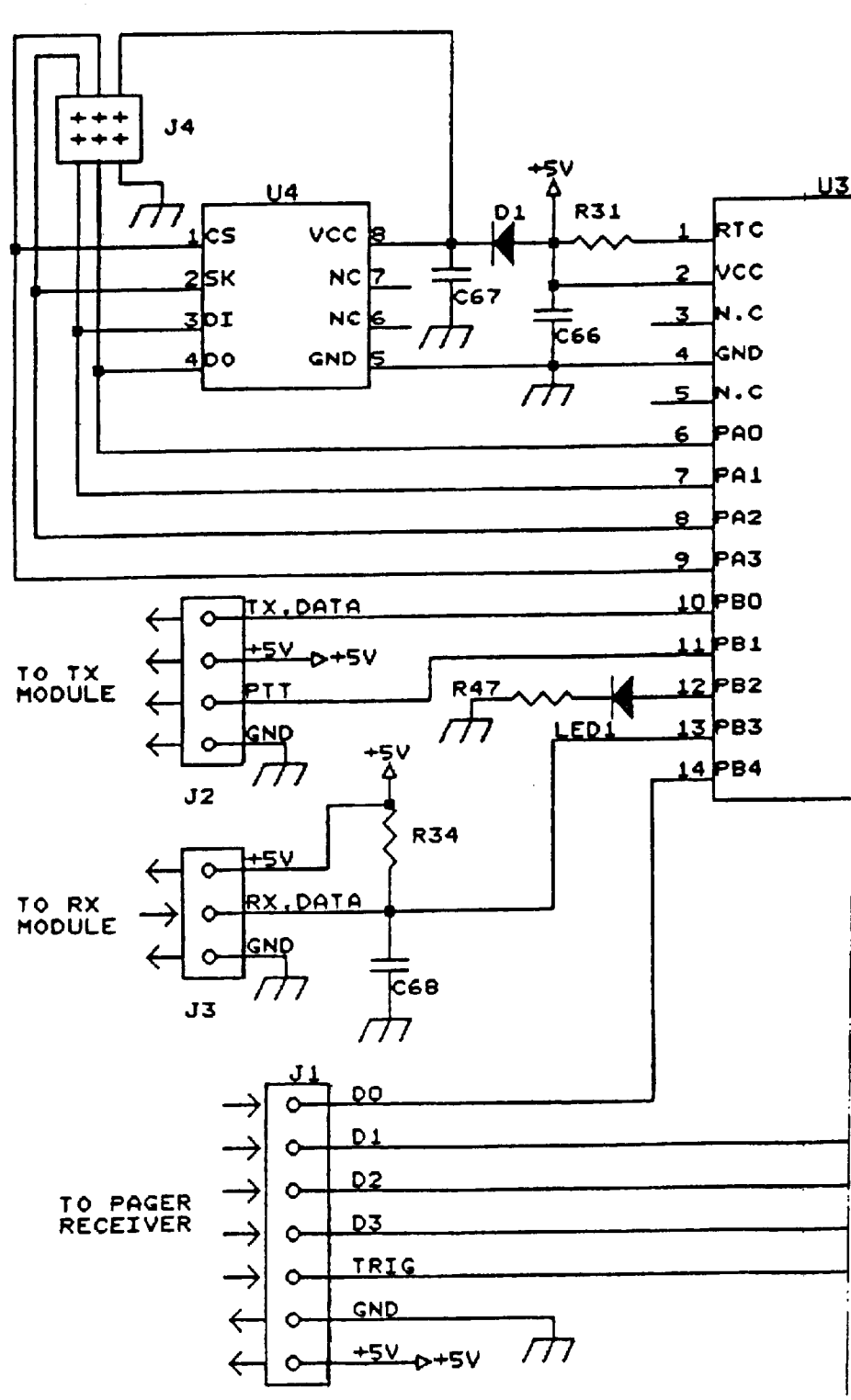

With reference to FIG. 2, the controller (12) has a pager receiver module (121), a transmitter module (122), a receiver module (123), a central control unit (124), an input connector (125), an output unit (126) and a memory (127) which stores the identification number of the controller (12), the identification number of the plurality of base stations (13), the identification number of the releaser (14) and the plate number of the car. Under the control of the central control unit (124), the controller (12) can receive pager signals via the pager receiver module (121) and communicate with the base stations (13) and the releaser (14) by digital wireless signals via the transmitter module (122) and the receiver module (123). The controller (12) is connected to the sensors (not shown) of the car via the input connector (125) to monitor the status of the car. Further, the controller (12) controls the operation of the car via the output unit (126). The pager receiver module (121), the transmitter module (122) and the receiver module (123) can be implemented by the circuit diagrams in FIG. 3A–E, FIG. 4A–C, and FIG. 5A–D, respectively. The central control unit (124), the input connector (125), the output unit (126) and the memory (127) can be implemented by the circuit diagram in FIG. 6.

Figure 7:
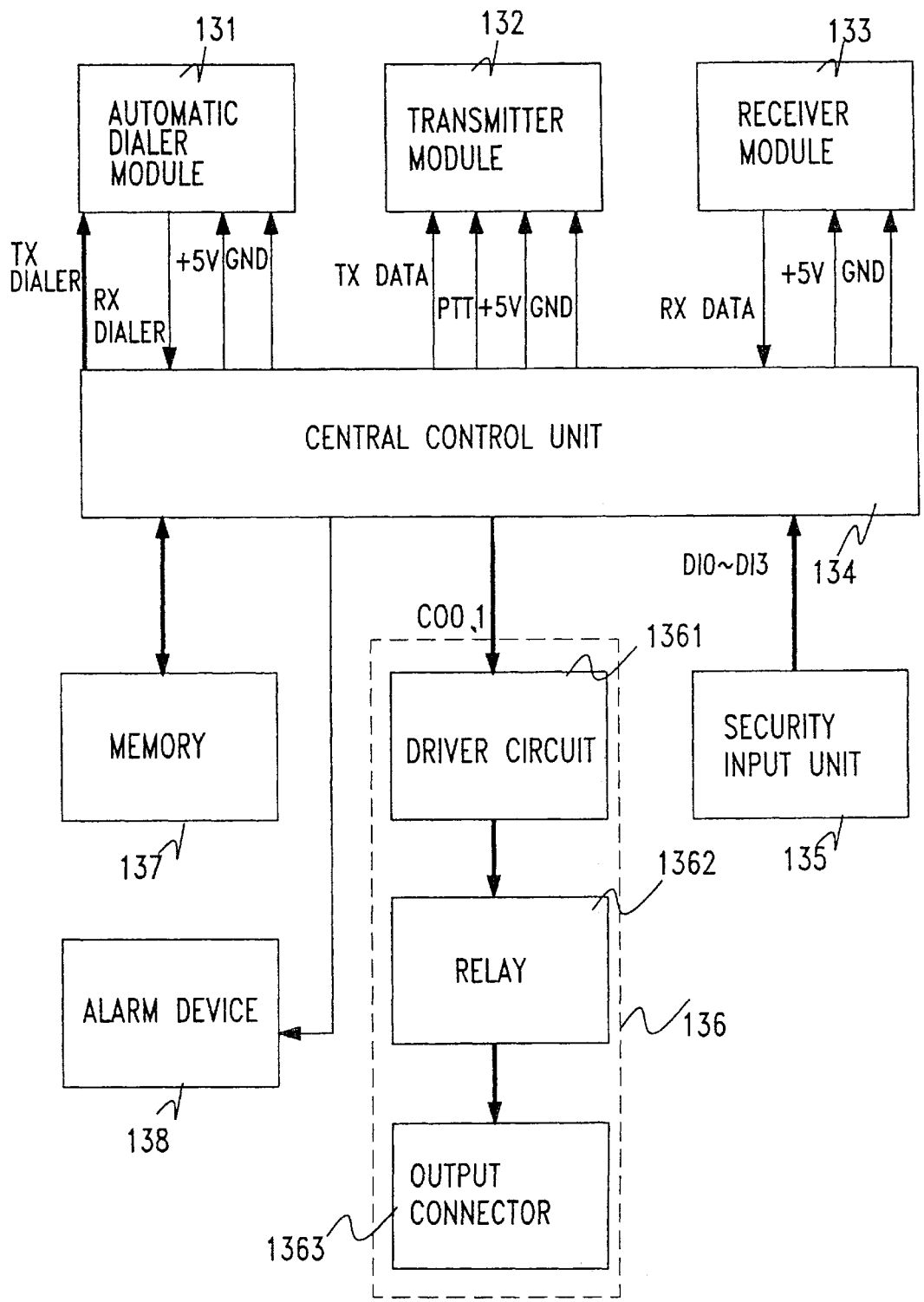
FIG. 7 is a functional block diagram of the base station shown in FIG. 1.

The base stations (13) are provided to locate a stolen car to stop the car and notify the control center (11) of the plate number of the car and the location of the car. Therefore, if the base stations (13) are installed in gas stations and houses which are close to roads, a stolen car can be located quickly. In addition, each base station (13) can be integrated with the home security and remote control system thereby enhancing its capability. Referring to FIG. 7, the base station (13) has an automatic dialer module (131), a transmitter module (132), a receiver module (133), a central control unit (134), an output unit (136), a security input unit (135), an alarm device (138) and a memory (137) which stores data including the identification number of the controller (12), the identification number of the plurality of base stations (13), the location of each base station (13), the phone numbers of the telephone device (112) and the pager receiver of the control center (11), the security setting password and the security release password. Under the control of the central control unit (134), the base station (13) can establish a connection with the control center (11) via the automatic dialer module (131) and communicate with the controller (12) by digital wireless signals via the transmitter module (132) and receiver module (133).

Further, the base station (13) can be connected to sensors on the windows and doors of a house in which the base station (13) is installed via the security input unit (135) to monitor the status of the house thereby providing a burglary prevention and detection function. Further, the base station (13) is also capable of controlling the operation of external devices via the output unit (136). The alarm device (138) is provided to indicate abnormal conditions.

Figure 8:
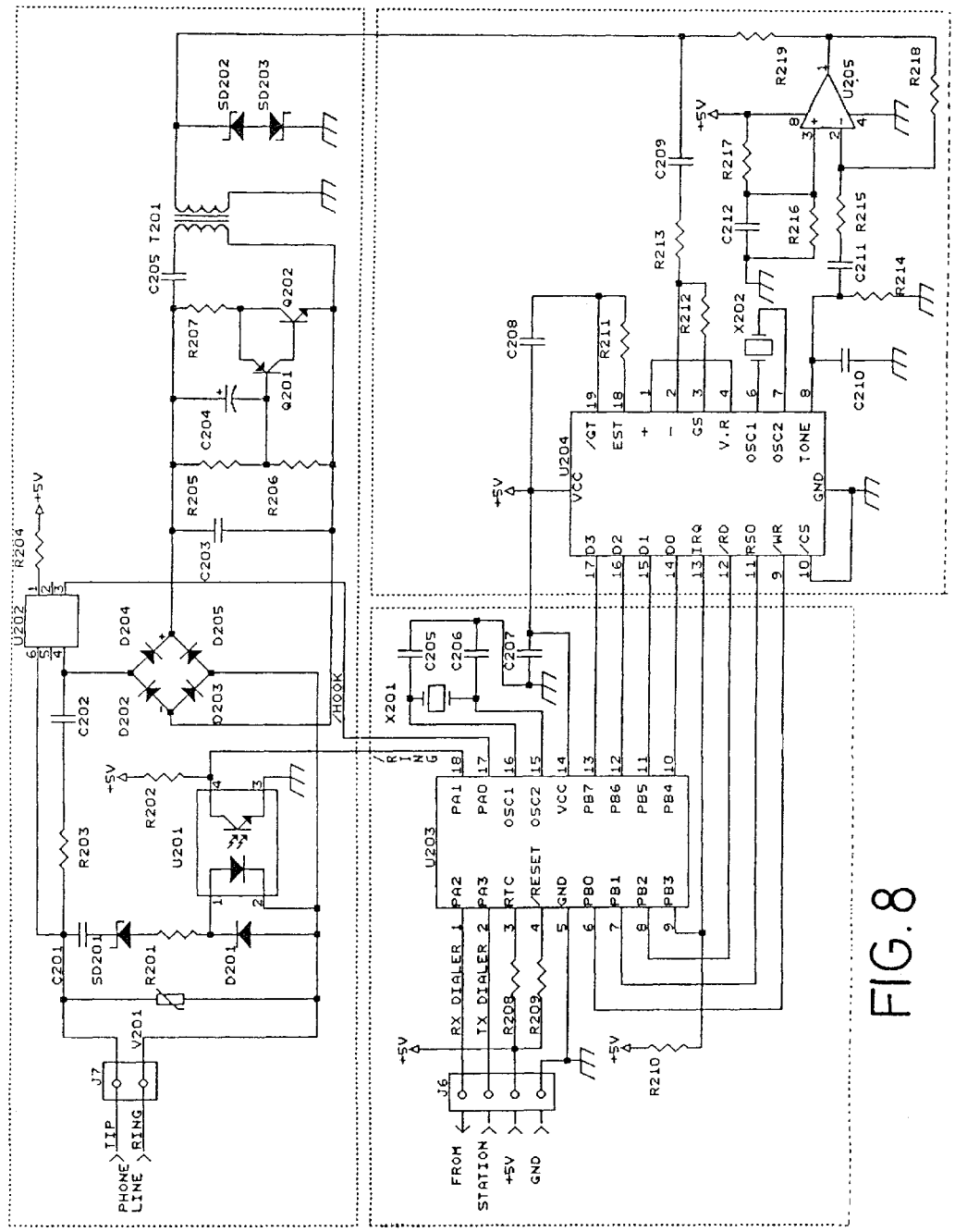
FIG. 8 is a circuit diagram for implementing the automatic dialer module of the base station shown in FIG. 7.
Figure 9:
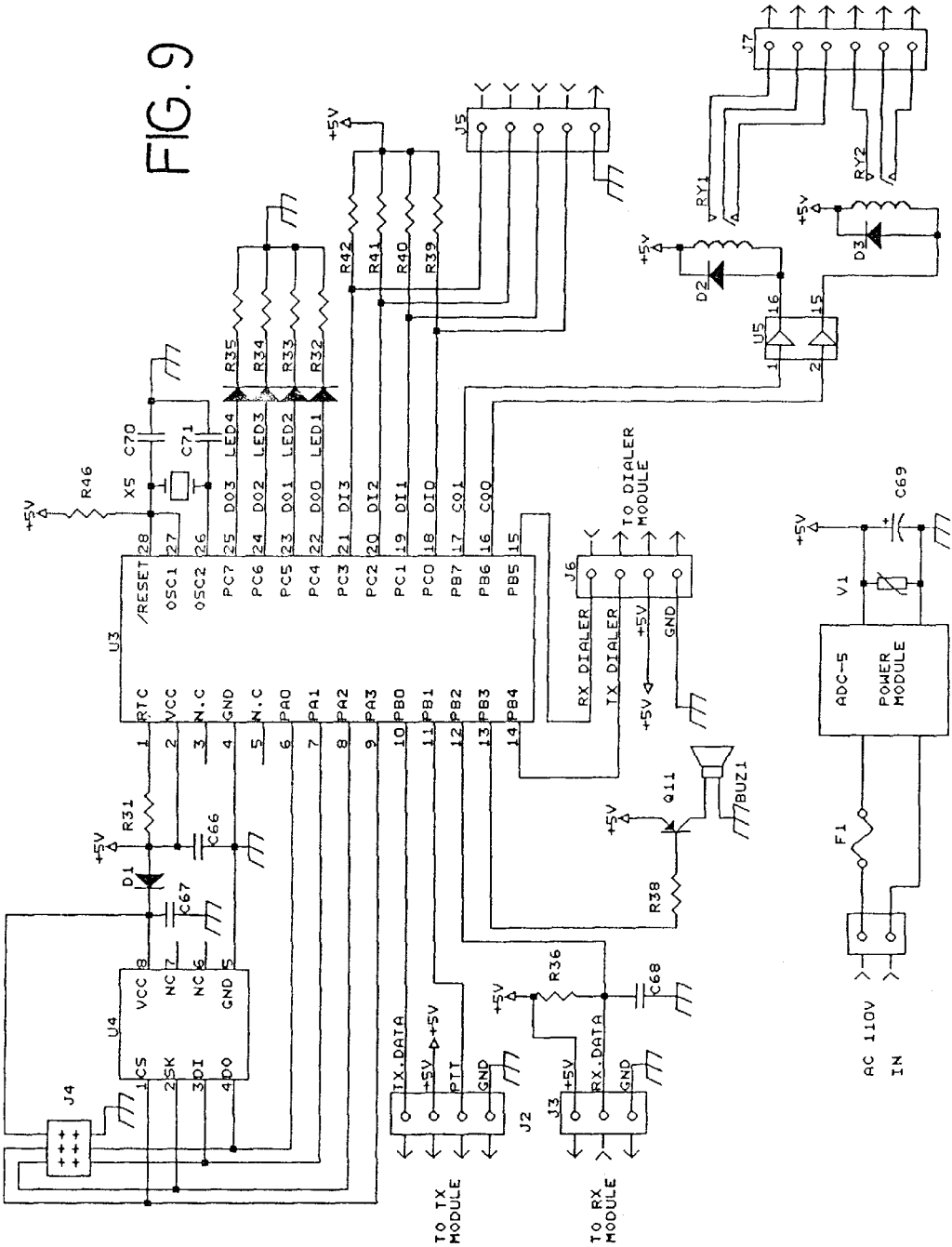
FIG. 9 is a circuit diagram for implementing the central control unit, the output unit, the security input unit, the alarm device and the memory of the base station shown in FIG. 7.

The transmitter module (132) and the receiver module (133) of the base station (13) can be implemented by circuit diagrams similar to those of the transmitter module (122) and the receiver module (123) of the controller (12). The automatic dialer module (131) can be implemented by the circuit diagram in FIG. 8. The central control unit (134), the output unit (136), the security input unit (135), the alarm device (138) and the memory (137) can be implemented by the circuit diagram in FIG. 9.

Figure 10:
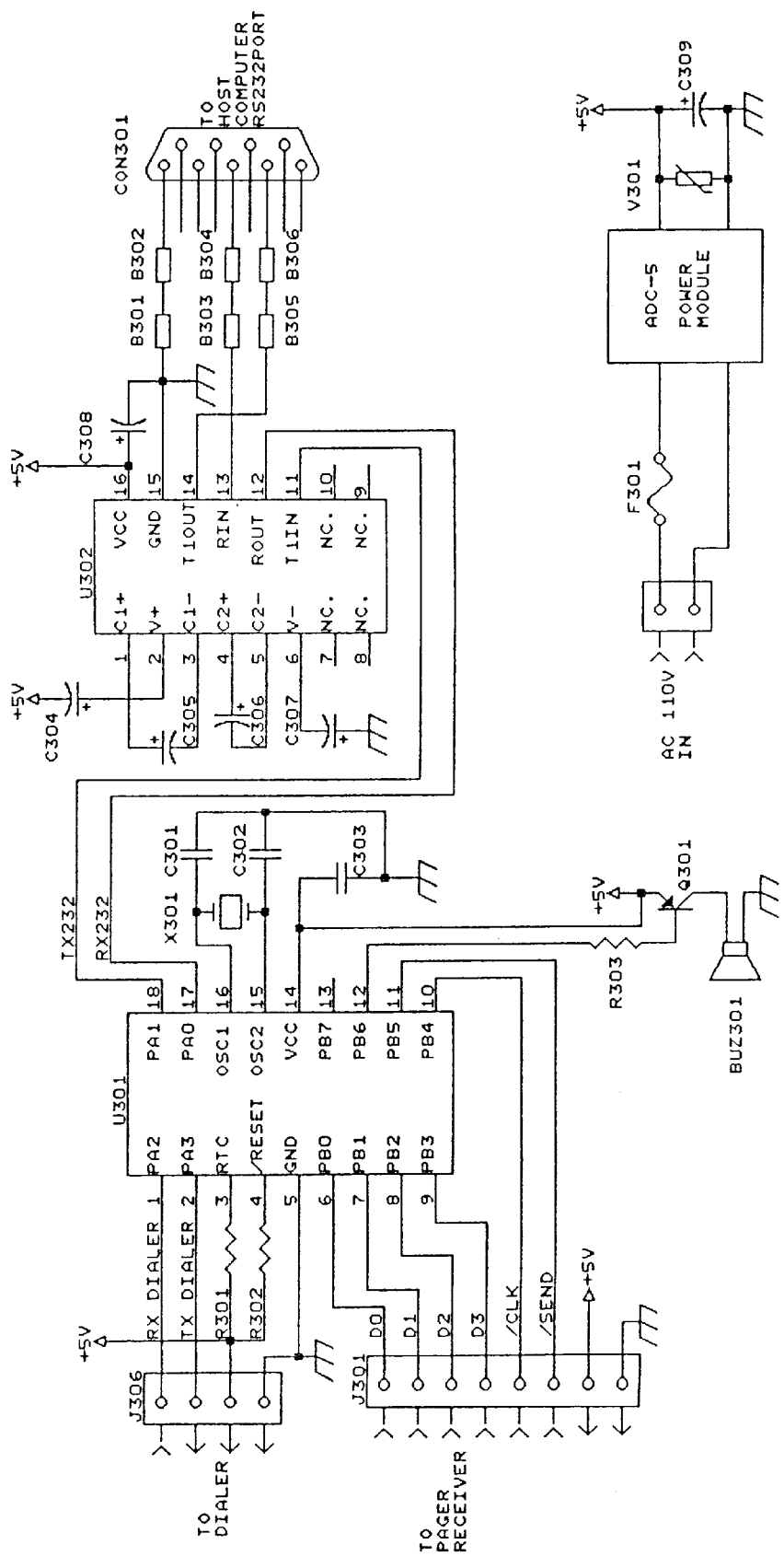
FIG. 10 is a circuit diagram for implementing the master controller of the control center shown in FIG. 1.

With reference to FIG. 1, the control center (11) includes a telephone (112), a master controller (113) and a computer (111). The master controller (113) has an automatic telephone dialer and a pager receiver, which can be implemented by the circuit diagram in FIG. 10. The computer (111) has software with built-in data including control passwords, plate numbers of cars, basic data and passwords of car owners, the telephone numbers, identification number and locations of all base stations (13) and the map of the area under control. Therefore, when a car owner finds that his/her car has been stolen, he/she can make a telephone call to the telephone device (112) of the control center (11) thereby entering car owner data into the computer (111) to check against the built-in data. After the data is confirmed by the computer (111), the master controller (113) automatically calls the pager receiver module (121) of the controller (12) via the automatic telephone dialer to command the controller (12) to enter into a searching mode. In the searching mode, the transmitter module (122) of the controller (12) transmits a wireless searching signal, which includes the base station ID, plate number of the car and searching code, to search for a base station (13). The transmission time is about 1.5 seconds. Then, the receiver module (123) will receive a response from a base station (13). The receiving time is also 1.5 seconds. If a response is not received, the transmitter module (122) continues to transmit searching signals until a response from a base station (13) is received.

When the stolen car is within the effective range (about 50 to 100 meters) of a base station (13), the base station will receive the searching signal from the controller (12) installed in the car. After the base station confirms the searching code of the searching signal, the controller (12) is registered in the base station (13). The base station (13) then transmits a digital wireless control signal including a gas and electricity stop command to stop supplying gas and electricity to the car. When the controller (12) in the car receives the control signal, the controller (12) will transmit a confirmation signal to the base station (13) and activate the driver circuit (1261) and the relay (1262) of the output unit (126) to sound an alarm or audible device (not shown) connected with the connector (1263) thereby notifying the driver that the supply of gas and electricity to the car is going to be terminated. After about 3 seconds, the relay (1262) is operated to stop supplying gas and electricity to the car thereby forcing the car to stop, wherein the relay (1262) is operated in such an manner that it is alternatively turned on and off three times, each of the on duration and off duration is 1 second, before completely stopping the supply of electricity, thereby assuring the safety of the driver.

Figure 11:
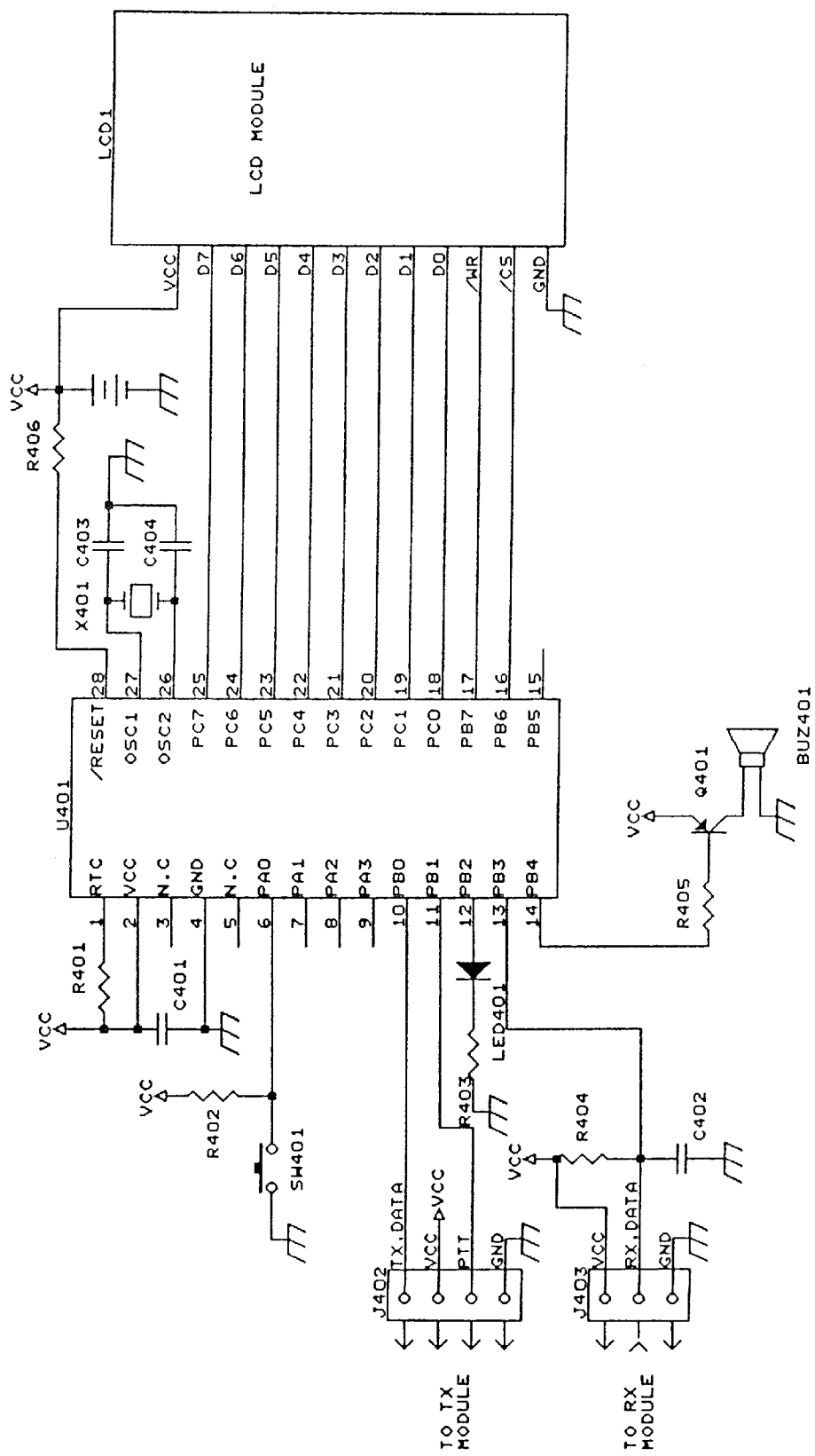
FIG. 11 is a circuit diagram for implementing the releaser shown in FIG. 1.

When the base station (13) receives the confirmation signal, the automatic caller module (131) initiates a telephone connection to the control center (11) whereby the base station (13) transmits its location and the plate number of the car to the control center (11). Accordingly, the stolen car is located and the car owner can be notified of such. In case the telephone line of the control center (11) is out of order, the base station (13) triggers the alarm device (138) and calls the pager receiver of the master controller (113) thereby transmitting its location and the plate number of the car to the control center (11) through a pager network. When the car owner or the personnel from the control center (11) reach the car, the releaser (14) is used to release the car from being controlled by the controller (12). The releaser (14) can automatically communicate with the controller (12) by digital wireless signals in a manner similar to the communication between the controller (12) and the base station (13) with one difference in that the gas and electricity stop command is replaced by a release command. Accordingly, the car can be re-supplied with gas and electricity. The releaser (14) can be implemented by the circuit diagram in FIG. 11.

When the car is stopped by terminating the gas supply and electricity thereto, the controller (12) and the base station

(13) are still kept in communication. If such a communication is terminated (such that the car is towed away by a tow truck), the base station (13) will notify the control center (11) that the car is out of the area controlled by the base station (13). Again, when the car enters an area controlled by another base station (13), this base station will notify the control center (11) of such. Therefore, even though the car is towed away, the control center is able to trace where the car is. Accordingly, the location capability of the security system in accordance with the present invention is close to that of the GPS.

Furthermore, the security input unit (135) of the base station (13) can be connected to sensors on the windows and doors of a house in which a base station (13) is installed to provide a burglary prevention and detection function when the home security option is selected. The base station (13) can detect abnormal conditions of the house to notify the control center (11) via the automatic dialer module (131).

The base station (13) can also be connected to electrical appliances in the house via the output connector (1363) of the output unit (136) whereby a user can make a phone call to the base station (13) and remotely control the electrical appliances via the driver circuit (1361) and relay (1362) of the output unit (136), such as turning on an air conditioner or lights.

Although the present invention has been explained in relation to its preferred embodiment, it is to be understood that many other possible modifications and variations can be made without departing from the spirit and scope of the invention as hereinafter claimed.

What is claimed is:

1. A security system capable of locating a stolen car and protecting a house against burglary, said security system comprising:

a control center (11) having a telephone device (112), a master controller (113) and a computer (111), said master controller (113) having an automatic telephone dialer and a pager receiver, said computer (111) having built-in car and car owner data, each of said telephone device (112) and said pager receiver having a phone number;

a controller (12) adapted to be installed in a car for controlling the operation of the car, said controller (12) having a pager receiver module (121) for receiving paging signals, a transmitter module (122) for transmitting wireless signals, and a receiver module (123) for receiving wireless signals; and a plurality of base stations (13) installed in different locations, each base station (13) having an automatic dialer module (131), a transmitter module (132) for transmitting wireless signals, and a receiver module (133) for receiving wireless signals, wherein, when a car owner finds that a car has been stolen, a telephone call is connected to the telephone device (112) of said control center (11) to enter said car owner data to be checked against said built-in data so that said master controller (113) calls the pager receiver module (121) of the controller (12) via said automatic telephone dialer to command said controller (12) to enter into a searching mode in which the transmitter module (122) of said controller (12) transmits a wireless searching signal to search for a base station (13), the transmitter module (132) of said base station (13) transmitting a wireless control signal after receiving said wireless searching signal via the receiver module (133) thereof, said controller (12) being activated to control the operation of said car after receiving said control signal via the receiver module (123) thereof.

2. The security system as claimed in claim 1 further comprising a releaser (14) capable of communicating with said controller (12) via wireless signals to release said car from being controlled by said controller (12).

3. The security system as claimed in claim 2, wherein each of said controller (12), said plurality of base stations (13) and said releaser (14) has an identification number.

4. The security system as claimed in claim 3, wherein said controller (12) further comprises a central control unit (124), an input connector (125), an output unit (126) and a memory (127) which stores the identification numbers of said controller (12), said plurality of base stations (13) and said releaser (14).

5. The security system as claimed in claim 4, wherein each base station (13) comprises a central control unit (134), an output unit (136), a security input unit (135), an alarm device (138) and a memory (137) which stores the identification number of said controller (12), the identification number of said plurality of base stations (13), the location of each base station (13) and the phone numbers of said telephone device (112) and said pager receiver of said control center (11).

6. The security system as claimed in claim 5, wherein said control signal includes a gas and electricity stop command to stop supplying gas and electricity to said car thereby forcing said car to stop.

7. The security system as claimed in claim 6, wherein said base station (13) transmits the location thereof and the data of said car to said control center (11) via a telephone connection initiated by said automatic caller module (131).

8. The security system as claimed in claim 7, wherein said base stations are adapted to be installed in gas stations and houses which are close to roads.

9. The security system as claimed in claim 8, wherein said security input unit (135) of each base station (13) is adapted to connect to sensors on the windows and doors of a house in which a base station (13) is installed thereby providing a burglary detection and prevention function.

10. The security system as claimed in claim 9, wherein said output unit (136) of each base station (13) is adapted to connect to electrical appliances in a house in which a base station (13) is installed whereby a user can remotely control said electrical appliances by establishing a telephone connection to said base station (13).

* * * * *